United States Patent [19]

Pulver et al.

[11] 4,211,319
[45] Jul. 8, 1980

[54] OVEN UNLOADER

[75] Inventors: W. Clark Pulver, Burbank, Ill.; Maynard R. Euverard, Williamsburg, Va.; Henry A. Heide, Addison; Ronald P. Ziolkowski, South Holland, both of Ill.

[73] Assignee: Velten & Pulver, Inc., Chicago Ridge, Ill.

[21] Appl. No.: 843,979

[22] Filed: Oct. 20, 1977

[51] Int. Cl.$^2$ ............................................. B65G 47/26
[52] U.S. Cl. .................................... 198/432; 198/469; 198/487
[58] Field of Search ............... 198/469, 432, 474, 477, 198/483, 487, 478–479, 482, 486, 443, 473, 426, 427, 434, 447, 681, 685, 457, 484, 796, 622, 732; 214/1 BA, 1 BB

[56] References Cited

U.S. PATENT DOCUMENTS

| 2,371,877 | 3/1945 | Crosland | 198/457 X |
| 3,198,309 | 8/1965 | Ogawa | 198/488 |
| 3,580,392 | 5/1971 | Starbuck | 198/486 X |

Primary Examiner—Robert B. Reeves
Assistant Examiner—Douglas D. Watts
Attorney, Agent, or Firm—Vogel, Dithmar, Stotland, Stratman & Levy

[57] ABSTRACT

Apparatus for automatically transferring elongated rows of articles from an oven hearth conveyor moving continuously in a first direction essentially normal to the longitudinal axes of the rows of articles thereon includes an outfeed conveyor continuously moving in a second direction disposed at an obtuse angle to the first direction and having a lateral width substantially less than the length of a row of articles. An endless transfer conveyor extends between the hearth and outfeed conveyors and carries thereon pickup mechanism mounted for pivotal movement about an axis parallel to the longitudinal axes of the rows of articles for engaging and lifting a row of articles from the hearth conveyor and carrying it in a level upright condition to the outfeed conveyor without changing the orientation of the longitudinal axis of the row of articles. Cam-actuated unloading means at the outfeed conveyor engage the row of articles for removing them from the pickup means and holding them on the outfeed conveyor. Cam-actuated backstop means is provided at the hearth conveyor to facilitate pickup of the row of articles by the pickup means. The width and speed of the outfeed conveyor are respectively directly and inversely proportional to the obtuse angle between the first and second directions and are such as to accommodate each row of articles as it arrives at the outfeed conveyor. Control means synchronize the movement of the transfer conveyor with that of the rows of articles along the hearth conveyor.

10 Claims, 13 Drawing Figures

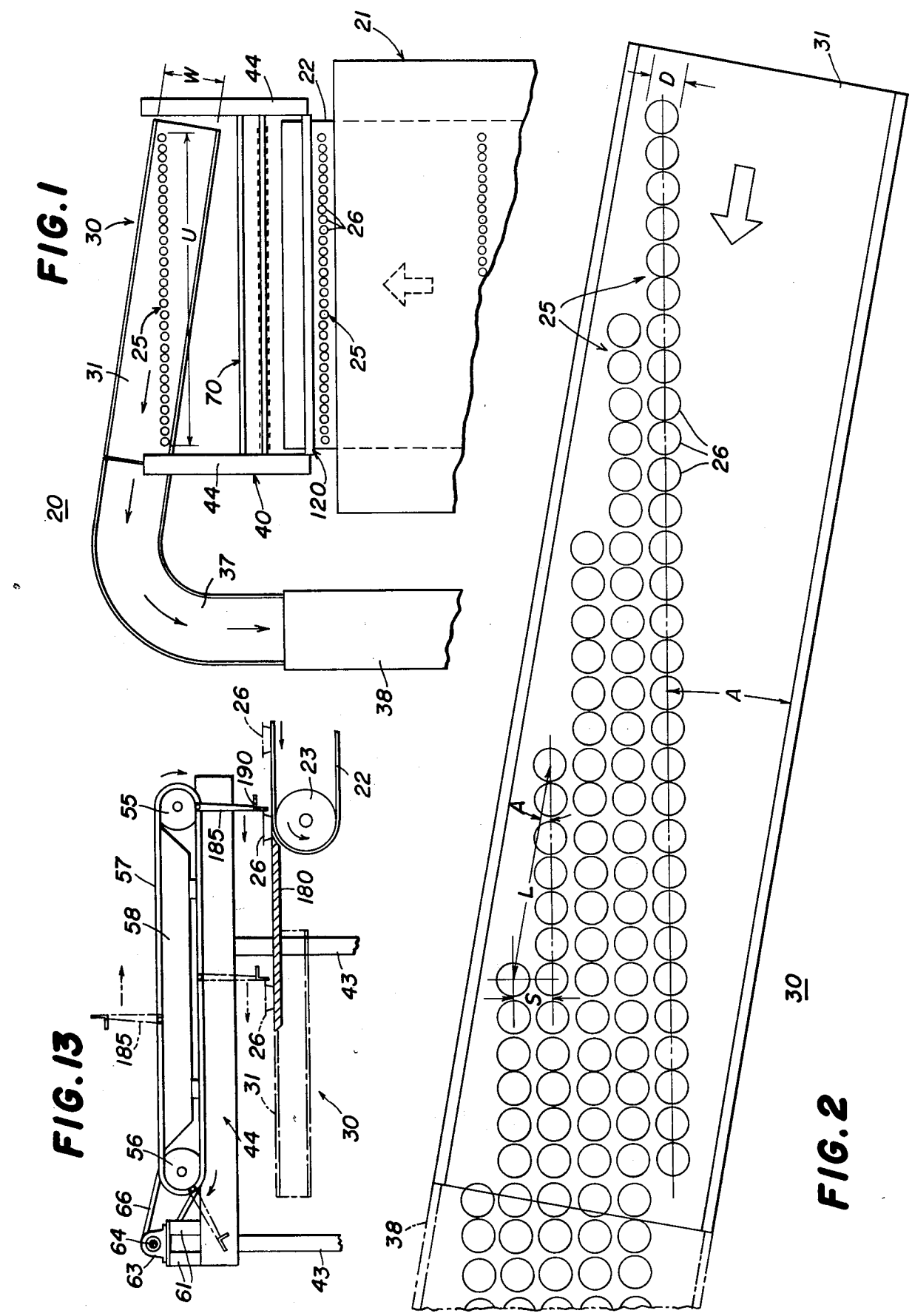

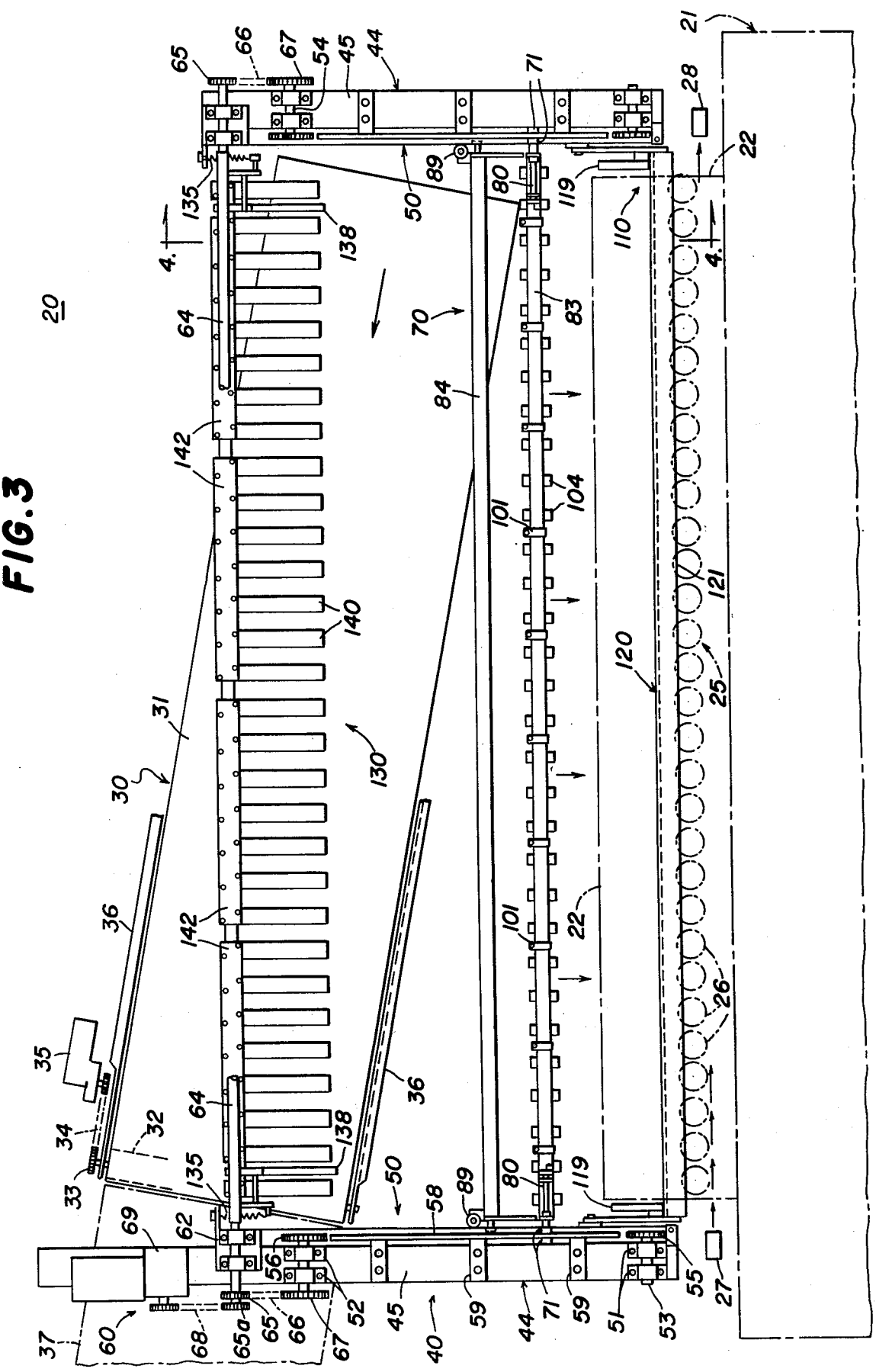

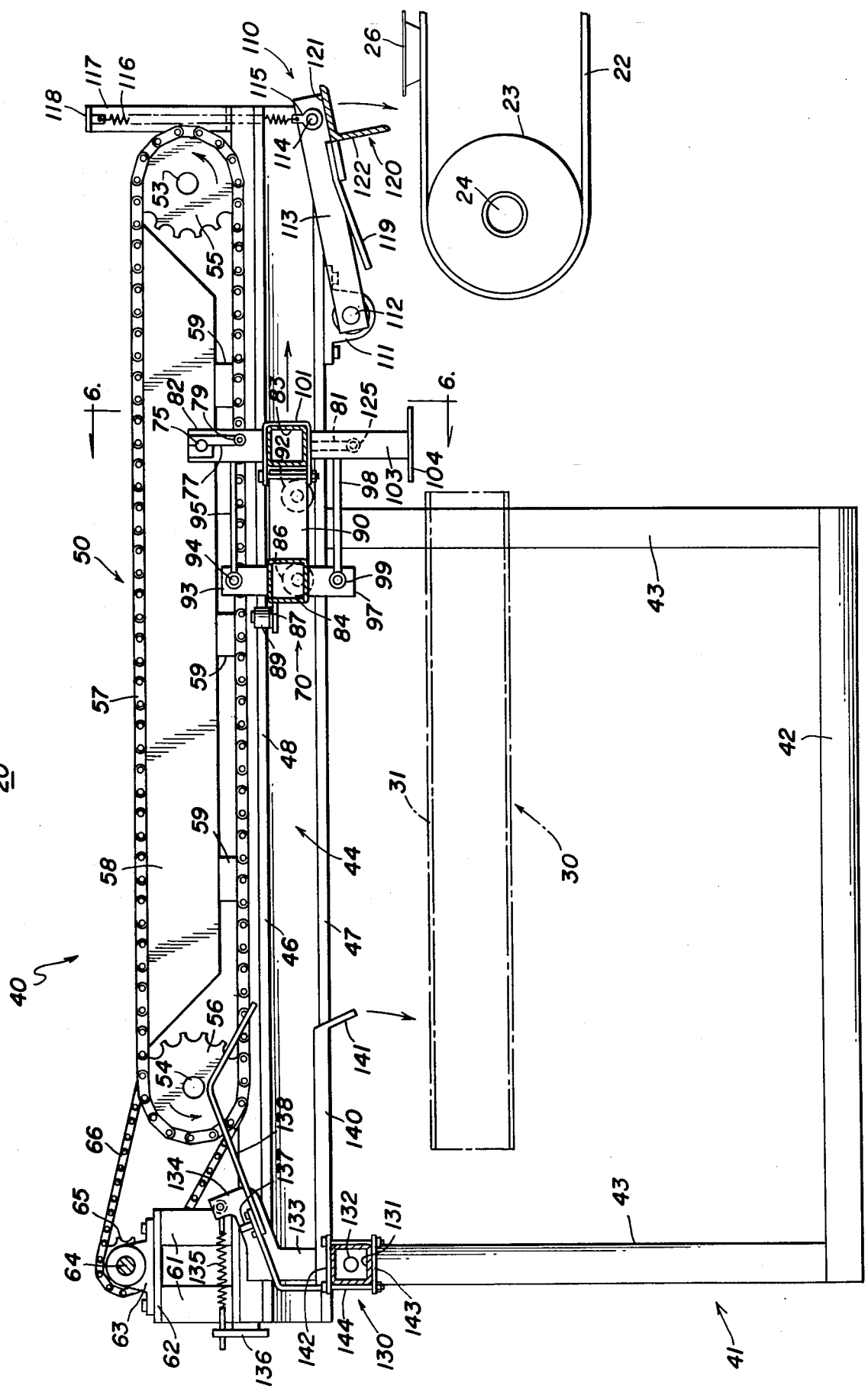

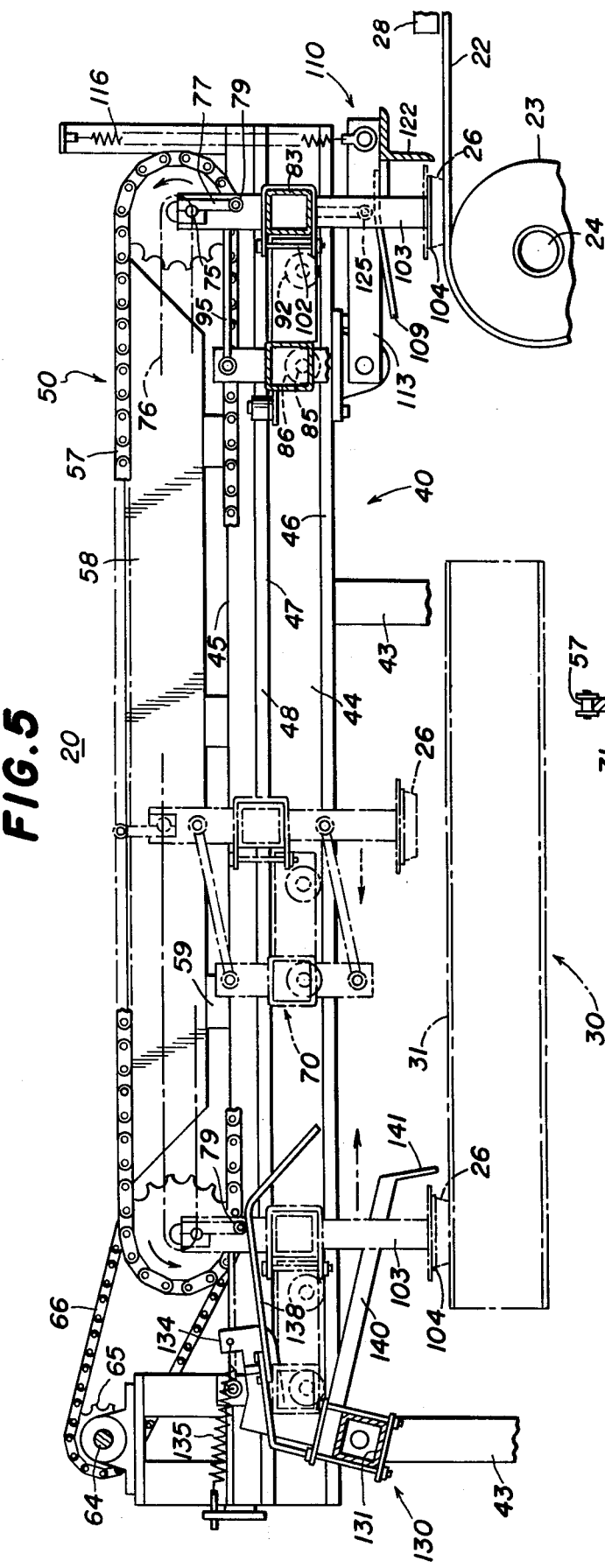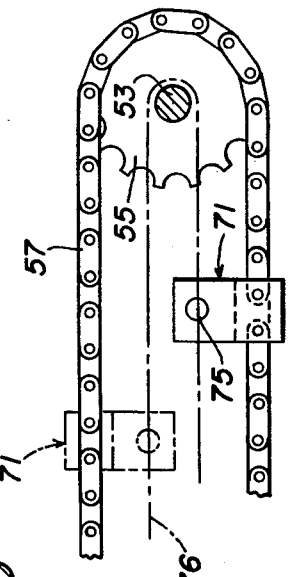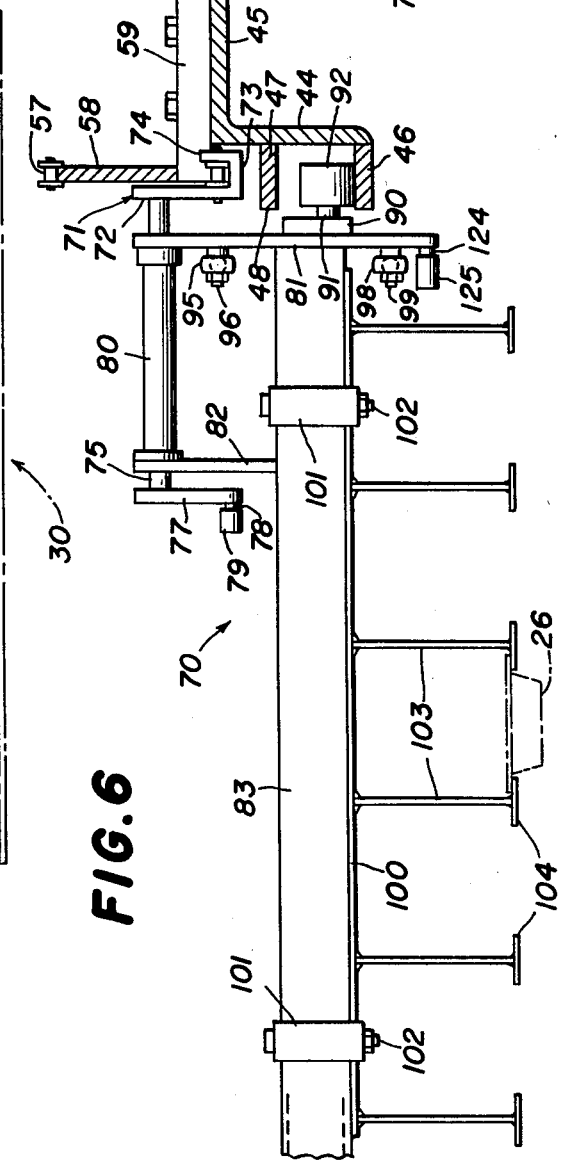

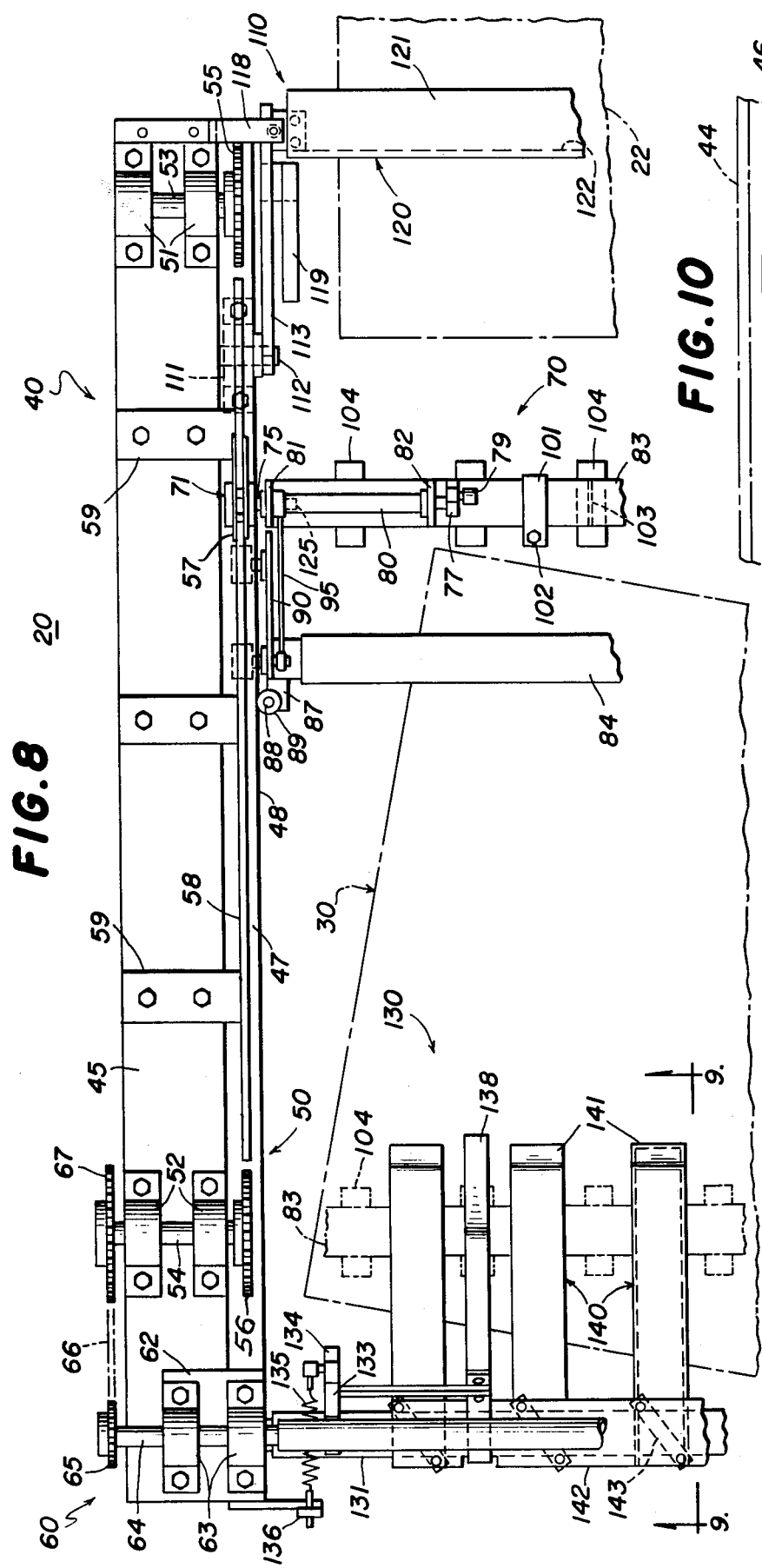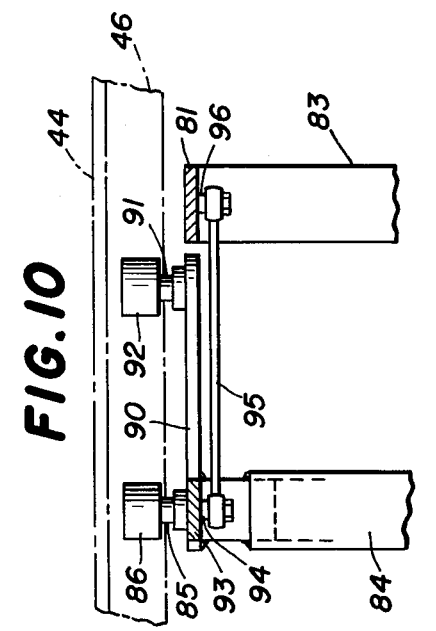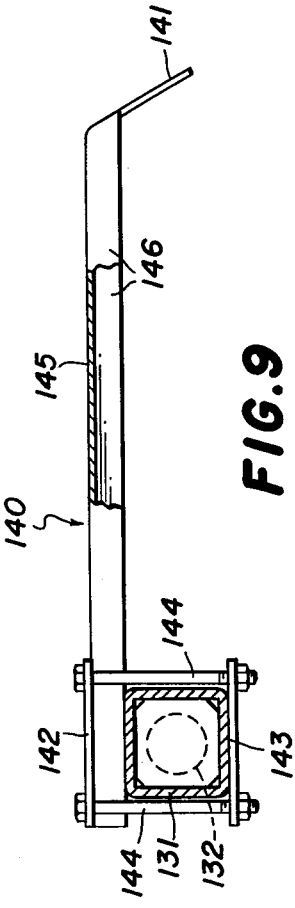

OVEN UNLOADER

BACKGROUND OF THE INVENTION AND PRIOR ART STATEMENT

The present invention relates to apparatus for transferring rows of discrete articles from a moving conveyor and, in particular, relates to such an apparatus for use in unloading rows of fragile baked products from a bakery oven and transferring the baked articles to further bakery processing operations.

Typically, continuous bakery ovens include a wide hearth conveyor which carries longitudinally spaced-apart transverse rows of product through the oven for baking and then delivers the baked product to further processing stations, such as for cooling, depanning, packaging and the like. The mechanism for unloading an oven hearth conveyor is typically a take-away conveyor which travels at right angles to the direction of travel of the hearth conveyor. The take-away conveyor comes to rest to permit a row of product from the hearth conveyor to be deposited thereon, and then is started and runs a distance equal to at least the width of the hearth conveyor so as to remove the unloaded product from in front of the hearth conveyor and provide space for the next row of product coming from the oven. In this arrangement, the unloaded product must normally be regrouped downstream of the oven unloader by either accelerating or delaying the row of product to provide the proper grouping and spacing for further processing, since the downstream processing operations, such as cooling, typically operate upon a stream of product several articles wide, but considerably narrower than the width of the hearth conveyor. This arrangement is satisfactory for rigid products such as bun or bread pans which are not adversely affected by the regrouping process.

But in the case of fragile items such as pies which are baked in thin foils or tins, the prior art unloading process is not satisfactory, because any physical regrouping of the unloaded product to attain the desired spacing for further processing can be detrimental to the fragile baked products.

Furthermore, even with relatively rigid products such as bun pans and bread pans, the intermittent motion of the take-away conveyor and the concomitant downstream regrouping is a complicated, expensive and inconvenient arrangement, since each additional step of product manipulation increases the complexity of the system and the possibility of damage to the product.

There is, therefore, a need for an apparatus for unloading a bakery oven in such a way that the unloaded product can be continuously carried away from the oven in a different direction and in a product grouping suitable for downstream processing so as to obviate further regrouping or respacing of the product. Applicants are not aware of any such unloading arrangement in the prior art. Applicants have no literature dealing with the prior art oven unloaders described above.

SUMMARY OF THE INVENTION

It is a general object of this invention to provide apparatus for unloading longitudinally spaced-apart rows of articles from a continuously moving first conveyor and transferring them to a second conveyor continuously moving in a different direction.

It is a further object of this invention to provide apparatus of the type set forth wherein the second conveyor is substantially narrower than the first conveyor.

Still another object of this invention is to provide apparatus of the type set forth wherein the linear speed of the second conveyor is greater than that of the first conveyor.

A more specific object of the present invention is to provide an oven unloader for unloading rows of fragile articles such as baked pies from a continuously moving oven conveyor to a take-away or outfeed conveyor continuously moving in a different direction so that the unloaded pies are automatically regrouped in a grouping suitable for downstream processing without damage to the pies.

In connection with the foregoing object, it is an object of this invention to provide apparatus for unloading rows of baked articles from a continuously moving oven conveyor to a take-away conveyor continuously moving in a different direction at a different speed and having a different width.

In summary, the foregoing objects are attained by providing apparatus for transferring elongated rows of articles from a first conveyor moving continuously in a first direction essentially normal to the longitudinal axes of the rows of articles thereon, the apparatus comprising a continuously moving second conveyor moving in a second direction disposed at an obtuse angle to the first direction, the second conveyor having a lateral width substantially less than the length of a row of articles, and transfer means for moving the rows of articles from the first conveyor to the second conveyor without changing the orientation of the longitudinal axes of the rows of articles, whereby the direction and width of the article path are changed while maintaining the continuous movement of the first and second conveyors.

Further features of the invention pertain to the particular arrangement of the parts of the oven unloader whereby the above-outlined and additional operating features thereof are attained.

The invention, both as to its organization and method of operation, together with further objects and advantages thereof, will best be understood by reference to the following specification taken in connection with the accompanying drawings.

BRIEF DESCRIPTION OF THE DRAWINGS

FIG. 1 is a top plan view of an oven unloader constructed in accordance with and embodying the features of the present invention;

FIG. 2 is an enlarged fragmentary top plan view of the take-away or outfeed conveyor of the oven unloader illustrated in FIG. 1, illustrating the arrangement thereon of the unloaded rows of articles;

FIG. 3 is an enlarged top plan view of the oven unloader illustrated in FIG. 1, with the transfer conveyor illustrated in its standby position;

FIG. 4 is a further enlarged view in vertical section taken along the line 4—4 in FIG. 3;

FIG. 5 is a fragmentary view, similar to FIG. 4, and illustrating several positions of the transfer conveyor;

FIG. 6 is a fragmentary view in vertical section taken along the line 6—6 in FIG. 4;

FIG. 7 is a further enlarged view of the right-hand end of the transfer conveyor, as illustrated in FIG. 5, and illustrating the path of the pickup carriage assembly mounting clip;

FIG. 8 is a further enlarged fragmentary top plan view of the right-hand end of the oven unloader illustrated in FIG. 3, rotated ninety degrees, and illustrating two positions of the pickup carriage assembly;

FIG. 9 is a still further enlarged fragmentary view in vertical section taken along the line 9—9 in FIG. 8, and illustrating one of the retaining arms;

FIG. 10 is a further enlarged fragmentary top plan view of the upper end of the pickup carriage assembly, as illustrated in FIG. 8, with portions of the pickup carriage assembly broken away more clearly to illustrate the construction thereof;

FIG. 13 is a reduced fragmentary view in partial vertical section, similar to FIG. 4, illustrating an alternative embodiment of the transfer mechanism of the present invention.

DESCRIPTION OF THE PREFERRED EMBODIMENT

Figure 11:
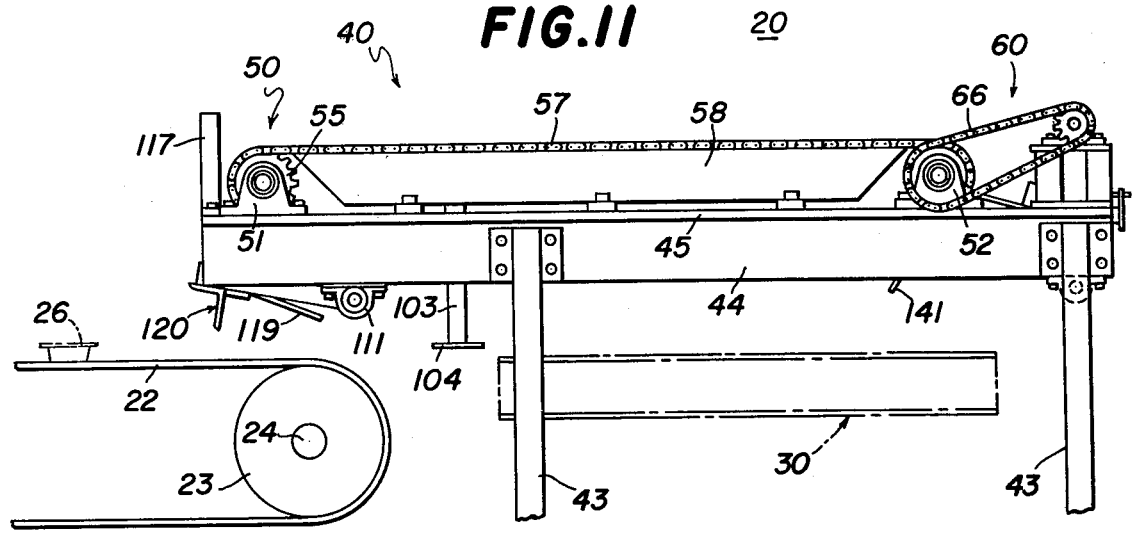
FIG. 11 is an enlarged fragmentary side elevational view of the oven unloader illustrated in FIG. 1, as viewed from the right-hand side thereof.

Referring now to FIGS. 1 through 4 and 11 of the drawings, there is illustrated an automatic oven unloading system, generally designated by the numeral 20, constructed in accordance with and embodying the features of the present invention, for unloading rows of baked articles from a bakery oven, generally designated by the numeral 21. The oven 21 has an elongated baking chamber through which the products to be baked are carried by a wide, continuously-moving endless hearth conveyor belt 22 which extends, at the exit end thereof, around a roller 23 rotatably mounted on a shaft 24. Typically, the articles to be baked are arranged in longitudinally spaced-apart rows extending laterally of the hearth conveyor 22 substantially normal to the direction of travel thereof indicated by the broad arrow in FIG. 1.

The present invention will specifically be disclosed in connection with the unloading of rows 25 of baked pies 26, which are typically baked in thin foils or tins having laterally outwardly extending annular flanges in a well-known manner. The diameter of the individual pies 26 typically ranges from four inches to ten inches, but it will be understood that the present invention could be used with other sizes and types of baked products. It will be noted that the pies 26 in a row 25 are preferably spaced a slight distance apart. A photorelay 29 is provided having a transmitter 27 and a receiver 28, respectively disposed along opposite side edges of the hearth conveyor 22 a predetermined distance from the exit end thereof (see FIGS. 3 and 12), for a purpose to be described more fully hereinafter.

The hearth conveyor 22 constitutes an infeed conveyor to the oven unloading system 20, which system also includes a take-away or outfeed conveyor, generally designated by the numeral 30, which includes an endless conveyor belt 31 extending around rollers 32 (one shown), one of which is provided with a sprocket 33 coupled by a chain 34 to a drive motor 35 for moving the outfeed conveyor 30 in the direction of the arrows in FIGS. 2 and 3. The outfeed conveyor 30 may also be provided with side rails 36, and is coupled via a corner conveyor section 37 to a straight conveyor section 38 leading to downstream processing stations.

The outfeed conveyor 30 is spaced a slight distance from the exit end of the hearth conveyor 22 and generally spans the entire width thereof. It is a significant feature of the present invention that the direction of travel of the outfeed conveyor 30 is disposed at a predetermined obtuse angle to the direction of travel of the hearth conveyor 22 and has a lateral width substantially less than that of the hearth conveyor 22. This arrangement affords unique advantages which will be described in greater detail below.

In order to transfer the pies 26 from the hearth conveyor 22 to the outfeed conveyor 30, there is provided a transfer system, generally designated by the numeral 40, which is supported on a framework 41 including horizontal base members 42 fixedly secured to upstanding support legs 43, preferably at least four in number. The support legs 43 are interconnected at the upper ends thereof by a pair of laterally spaced-apart parallel side plates 44 which extend between the hearth conveyor 22 and the outfeed conveyor 30, substantially parallel to the direction of travel of the hearth conveyor 22. Each of the side plates 44 has a horizontal support flange 45 extending laterally outwardly therefrom at the upper edge thereof and laterally inwardly extending lower and upper vertically spaced-apart guide flanges 46 and 47 (see FIG. 6). The side plates 44 are arranged with the corresponding flanges 45-47 thereof substantially coplanar.

Respectively supported by the side plates 44 are two transfer conveyor assemblies, each generally designated by the numeral 50, which are constructed substantially as mirror images of each other, wherefore only one will be described in detail. Each of the transfer conveyor assemblies 50 includes a pair of laterally spaced-apart coaxial front bearing brackets 51 fixedly mounted on the support flange 45 at the end thereof nearest the oven 21, and a pair of laterally spaced-apart coaxial rear bearing brackets 52 mounted on the support flange 45 adjacent to the other end thereof. Respectively journaled in the pairs of bearing brackets 51 and 52 are shafts 53 and 54 respectively provided with sprockets 55 and 56 secured to the inner ends thereof for driving an endless transfer conveyor chain 57 which defines an elongated loop lying substantially in a vertical plane and is preferably a roller chain. Disposed within the loop of the chain 57 is an elongated guide plate 58 supported on a plurality of support feet 59 which are secured to the support flange 45 of the associated side plate 44, the guide plate 58 serving to guide and support the upper reach of the chain 57.

The transfer system 40 also includes a drive assembly, generally designated by the numeral 60, which includes two pairs of upstanding posts 61 respectively supported on the support flanges 45 rearwardly of the rear bearing brackets 52 and respectively supporting two pedestals 62, on each of which is mounted a pair of laterally spaced-apart coaxial bearing brackets 63. Journaled in the bearing brackets 63 are the opposite ends of an elongated shaft 64 which extends laterally between the transfer conveyor assemblies 50, the ends of the shaft 64 extending laterally beyond the bearing brackets 63 and each carrying a sprocket 65, the sprockets 65 being respectively coupled by two chains 66 to sprockets 67 carried on the outer ends of the shafts 54. The left-hand end of the shaft 64, as viewed in FIG. 3, includes an additional sprocket 65a, which is coupled by a chain 68 to a suitably mounted drive motor 69. The drive motor 69 rotates the shaft 64 and thereby the chains 66 and 57 in a counterclockwise direction, as viewed in FIG. 4.

Referring now also to FIGS. 6 through 8 and 10 of the drawings, there is supported by and between the transfer conveyor assemblies 50 a pickup carriage assembly, generally designated by the numeral 70. The pickup carriage assembly 70 includes a pair of identically constructed mounting clips 71 respectively secured opposite each other to the chains 57, and each including an elongated inner arm 72 disposed along the inner surface of the chain 57 and connected by a bight portion 73 to a short outer arm 74 disposed along the outer surface of the chain 57, the inner and outer arms 72 and 74 being respectively secured to the opposite ends of one of the roller pins of the chain 57. Fixedly secured to the inner arms 74 of each of the mounting clips 71 and extending laterally inwardly therefrom are horizontal shafts 75, each having fixedly secured to the inner end thereof, one end of a corresponding short arm 77, which arms extend substantially normal to the longitudinal aixs of the shafts 75 and are respectively provided at the other ends thereof with short, laterally inwardly extending stub shafts 78 on which are rotatably mounted cam rollers 79. Surrounding each of the shafts 75 and rotatable with respect thereto is a bearing sleeve 80, having respectively fixedly secured to the opposite ends thereof for rotation therewith a long depending outer support arm 81 and a relatively short depending inner support arm 82.

It will be noted that the elongated inner arms 72 of the mounting clips 71 extend inwardly of the loops formed by the chains 57 and, since the mounting clips 71 are fixedly secured to the chains 57, they become inverted as the links on which they are mounted move around the sprockets 55. Referring to FIG. 7, it can be seen that the longitudinal axis of the shafts 75 travel in a path 76 as the chains 57 move, the upper and lower reaches of this path 76 being separated by no more than a few inches. But the support arms 81 and 82, being freely rotatable with respect to the shafts 75, remain in an orientation depending substantially vertically downwardly from the shafts 75 as the mounting clips are carried around the loop of the chains 57.

The pickup carriage assembly 70 also includes elongated parallel front and rear beams 83 and 84 extending laterally between the transfer conveyor assemblies 50, each of the beams 83 and 84 being of hollow tubular construction substantially rectangular in transverse cross section. The front beam 83 has the outer ends thereof respectively fixedly secured to the elongated outer support arms 81, the front beam 83 also being fixedly secured along the upper surface thereof to the short inner support arms 82, whereby the front beam 83 is ultimately supported by the chains 57 and the guide plates 58 of the transfer conveyor assemblies 50. The rear beam 84 is provided at the opposite ends thereof with two horizontal stub shafts 85 having respectively rotatably mounted thereon two support rollers 86 respectively disposed in rolling engagement with the inner surfaces of the lower guide flanges 46 of the side plates 44. Fixedly secured to the rear beam 44 adjacent to the opposite ends thereof and rearwardly extending therefrom are two short arms 87, each of which is provided with an upstanding stub shaft 88 having rotatably mounted thereon the corresponding one of two guide rollers 89 which are respectively disposed in rolling engagement with the inner edges 48 of the upper guide flanges 47 of the side plates 44 to restrain movement of the rear beam 84 laterally of the transfer system 40.

Respectively fixedly secured to the rear beam 84 at the opposite ends thereof and extending forwardly therefrom parallel to the side plates 44 are two short rectangular plates 90 which terminate just rearwardly of the front beam 83. The plates 90 respectively carry laterally outwardly extending coaxial stub shafts 91, the axes of which are substantially coplanar with those of the stub shafts 85, and on which are respectively rotatably mounted two support rollers 92 disposed in rolling engagement with the inner surfaces of the lower guide flanges 46 of the side plates 44. Thus, the rear beam 84, the plates 90 and the support rollers 86 and 92 cooperate to form a four-wheeled carriage which stabilizes the rear beam 84 and prevents any twisting or tilting movement thereof.

The rear beam 84 has fixedly secured thereto at each end thereof an upstanding arm 93 and a depending arm 97, each being provided with a laterally inwardly extending pivot pin 94, each of the upper pivot pins 94 having pivotally mounted thereon a forwardly extending link 95 and each of the lower pivot pins 94 having pivotally mounted thereon a forwardly extending link 98. The forward ends of the links 95 are respectively pivotally coupled to pivot pins 96 carried by the support arms 81 above the front beam 83, while the forward ends of the links 98 are respectively pivotally coupled to pivot pins 99 carried by the support arms 81 beneath the front beam 83.

It will be appreciated that the front and rear beams 83 and 84, together with the long support arms 81, the upstanding and depending arms 93 and 97 and the links 95 and 98 cooperate to form a parallelogram linkage which permits the rear beam 84 to roll stably along the lower guide flanges 46 of the side plates 44 while at the same time accommodating the up and down movement of the front beam 83 as it is carried by the conveyor chains 57. More particularly, because the front beam 83 is pivotally carried on the shafts 75, the front beam 83 and the members attached thereto remain depending vertically from the shafts 75, but they do move up and down a distance equal to the vertical distance between the upper and lower reaches of the shaft path 76, as the clips 71 are carried around the sprockets 55 and 56, this up and down movement being accommodated by the parallelogram linkage described above. At the same time, this parallelogram linkage, and the four-wheeled carriage arrangement of the rear beam 84 stabilizes the support arms 81 in a vertical position to prevent any free-swinging movement of the front beam 83. It will also be understood that, as the front beam 83 is being carried to the right along the lower reach of the conveyor chains 57, as viewed in FIG. 5, the rear beam 84 is being pulled along behind it, while when the front beam 83 is being moved to the left along the upper reach of the conveyor chains 57, as viewed in FIG. 5, the rear beam 84 is being pushed ahead of it, so that the rear beam 84 undergoes a reciprocalmovement back and forth along the tracks formed by the upper and lower guide flanges 46 and 47.

Disposed against the bottom surface of the front beam 83 and extending the length thereof is a flat elongated plate 100 which is secured in place by a plurality of longitudinally spaced-apart U-clamps 101 and associated bolts 102. Fixedly secured to the plate 100 and extending downwardly therefrom are a plurality of longitudinally spaced-apart pickup arms 103 (see FIG.

6) each being provided at the lower end thereof with a pickup finger 104 in the form of a short horizontal plate extending longitudinally and laterally beyond the edges of the associated pickup arm 103. The pickup arms and fingers 103 and 104 are so dimensioned and arranged that, as the pickup carriage assembly 70 moves to the position illustrated in solid line at the right-hand side of FIG. 5, the pickup arms 103 move between the pies 26 of the row of pies at the exit end of the hearth conveyor, with the pickup fingers 104 moving beneath the lateral rims of the pies (see FIG. 6). The number of pickup arms 113 is one greater than the number of pies 26 in the row 25 so that there is one pickup arm 103 disposed between each two adjacent ones of the pies 26, while the outermost two of the pickup arms 103 are respectively disposed beneath the outer edges of the end pies 26 of the row 25. Thus, as the front beam 83 lifts, the pickup fingers 104 cooperate simultaneously to lift the entire row of pies 26, with each pie being supported along two diametrically opposed portions of its rim, whereupon the row of pies 26 is carried by the pickup carriage assembly 70 in a stable upright condition to the outfeed conveyor 30.

The transfer system 40 also includes a backstop assembly, generally designated by the numeral 110, which is disposed adjacent to the exit end of the hearth conveyor 22. The backstop assembly 110 includes bearing brackets 111 respectively secured to the undersides of the lower guide flanges 46 of the side plates 44, and respectively having journaled therein two coaxial shafts 112 to which are respectively fixedly secured two forwardly extending arms 113 disposed a predetermined distance above the hearth conveyor 22. Each of the arms 113 is provided at the forward end thereof with a pivot pin 114 having pivotally mounted thereon an anchor coupling 115 to which is connected one end of a tension spring 116, the other end of which is anchored to an attachment flange 118 of an upstanding bracket arm 117 carried by the forward end of the side plate 44. Each arm 113 also has fixedly secured thereto a rearwardly and downwardly inclined cam plate 119. Extending laterally between the arms 113 and fixedly secured thereto adjacent to the forward ends thereof is an elongated stop bar, generally designated by the numeral 120, which is in the form of an angle iron having a generally horizontal upper flange 121 and a generally vertical depending flange 122, the longitudinal axis of the stop bar 120 being substantially parallel to the longitudinal axes of the rows 25 of pies 26 being conveyed along the hearth conveyor 22.

In operation, the stop bar 120 is normally resiliently urged by the tension springs 116 to a pass position, illustrated in FIG. 4, wherein the lower edge of the stop bar 120 is disposed a sufficient distance above the hearth conveyor 22 to allow passage of the rows of pies 26 therebeneath. Each of the support arms 81 of the pickup carriage assembly 70 is provided at the lower end thereof with a laterally inwardly extending stub shaft 124 having rotatably mounted thereon a cam roller 125. As the pickup carriage assembly 70 moves to the right from the position illustrated in FIG. 4, the cam rollers 125 move into camming engagement with the cam plates 119 for pivoting the backstop assembly 110 downwardly to the stop position illustrated in FIG. 5, in which position the depending flange 122 of the stop bar 120 blocks the path of the pies 26 along the hearth conveyor 22. The timing of the mechanism is such that a row of pies 26 will pass beneath the stop bar 120 just before it moves to the stop position thereof so that the stop bar 120 comes down immediately behind a row of pies. As the front beam 83 and the pickup fingers 104 lift while the support clips 71 move around the sprockets 75, the cam rollers 125 move out of engagement with the cam plates 109 to permit the backstop assembly 110 to return to the normal pass position thereof under the urging of the tension springs 116.

The transfer system 40 also includes an unloading assembly, generally designated by the numeral 130, disposed adjacent to the outfeed conveyor 30. The unloading assembly 130 includes an elongated beam 131 extending laterally between the side plates 44, the beam 131 being of hollow tubular construction substantially rectangular in transverse cross section, and being provided at the opposite ends thereof with stub shafts which are respectively journaled in suitable bearings (not shown) carried by two of the support legs 43 of the framework 41, just below the side plates 44. Respectively fixedly secured to the beam 131 at the opposite ends thereof are two upstanding arms 133, each provided with a finger 134 to which is attached one end of a corresponding one of two tension springs 135, the other ends of the tension springs 135 being respectively anchored on two anchor brackets 136 carried by the side plates 144. Each of the arms 133 is also provided with a laterally inwardly extending attachment bracket 137, to which are respectively secured two forwardly and rearwardly extending cam plates 138.

Referring also to FIG. 9, the beam 131 carries along the upper surface thereof a plurality of forwardly extending retaining arms 140 which are spaced apart longitudinally of the beam 131. Each of the retaining arms 140 is generally channel-shaped in transverse cross section, including an upper bight portion 145 and a pair of depending side flanges 146, and is provided at the forward end thereof with a downwardly and forwardly inclined retaining finger 141. Overlying the rear ends of the retaining arms 140 is a cap plate 142 which extends substantially the entire length of the beam 131 and is connected by bolts 144 to a plurality of longitudinally spaced-apart straps 143 along the underside of the beam 131 for cooperating to clamp the retaining arms 140 in place.

In operation, the unloading assembly 130 is normally resiliently held by the tension springs 135 in a pass position, illustrated in FIG. 4, wherein the retaining fingers 141 are disposed a predetermined distance above the outfeed conveyor 30 sufficient to permit passage thereunderneath of the rows of pies 26 carried by the pickup carriage assembly 70. As the pickup carriage assembly 70 moves toward the outfeed conveyor 30, it is in the configuration illustrated in broken line in FIG. 5, with the mounting clips 71 being carried along the upper reaches of the transfer conveyor chains 57. The pickup carriage assembly 70 continues moving to the left, as viewed in FIG. 5, until the rear beam 84 substantially overlies the beam 131 of the unloading assembly 130, at which time the mounting clips 71 begin to move downwardly around the sprockets 56, thereby lowering the row of pies 26 to the level of the outfeed conveyor 30 and bringing the cam roller 79 into camming engagement with the cam plates 138 for pivoting the unloading assembly 130 downwardly to the unloading position thereof, illustrated in solid line in FIG. 5.

In this unloading position, the retaining fingers 141 block the return paths of the pies 26 as the pickup carriage assembly 70 begins to move back toward the oven 21. There is one retaining arm 140 for each of the pies 26 in the row 25 being carried by the pickup carriage assembly 70, with the retaining arms 140 being arranged in interleaved or staggered relationship with respect to the pickup arms 103 so that the pickup arms 103 respectively pass between the retaining arms 140 as the mounting clips 71 move around the sprockets 56. In the unloading position thereof, the retaining fingers 141 respectively engage any pies 26 in the transported row which might fail to release from the pickup fingers 104 and hold them in position at an unloading or depositing station on the outfeed conveyor 30 as the pickup fingers 104 are carried from beneath the pie rims by the transfer conveyor chains 57. As the pickup fingers 104 move out of engagement with the pies 26 and back toward the hearth conveyor 22, the cam rollers 79 move out of engagement with the cam plates 138, permitting the unloading assembly 130 to be returned to the pass position thereof under the urging of the tension springs 135.

Figure 12:
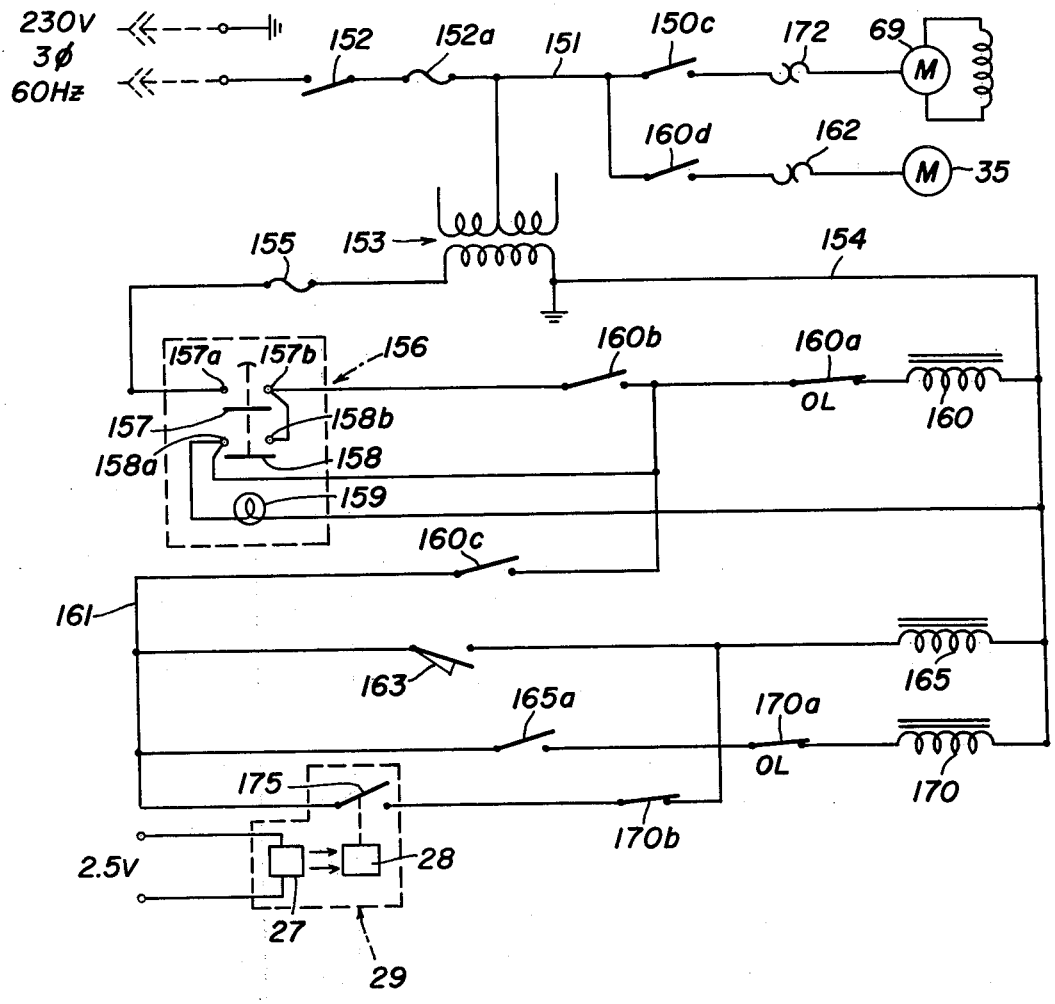
FIG. 12 is an electrical schematic diagram of the control circuit for the oven unloader of the present invention.

Referring now to FIG. 12 of the drawings, there is illustrated an electrical control circuit, generally designated by the numeral 150, for controlling the operation of the oven unloading system 20. The system is connected to a source of 230 volt, 3-phase, 60 Hz. power by a four-wire grounding plug and receptacle, with the three power wires being represented by a single line 151 which is connected through a power switch 152 and a fuse 152a to a transformer 153 producing 115 volt, single-phase power across the secondary thereof. One terminal of the transformer secondary is grounded and connected to a conductor 154, the other terminal of the transformer secondary being connected through a fuse 155 to one of the fixed contacts of a manually-operated double-pole single-throw control switch, generally designated by the numeral 156. The control switch 156 has a first pole with a movable contact 157 and fixed contacts 157a and 157b and a second pole with a movable contact 158 and fixed contacts 158a and 158b. The fixed contacts 157b and 158b are tied together. The fixed contact 158a is connected through a lamp 159 to the conductor 154.

The fixed contact 157b is connected to one terminal of a coil of an outfeed conveyor motor relay 160 through the normally-closed overload contacts 160a and normally-open contacts 160b thereof, the other terminal of the coil of the relay 160 being connected to the conductor 154. The junction between the relay contacts 160a and 160b is connected to the fixed contact 158a of the control switch 156 and is also connected through the normally-open contacts 160c of the relay 160 to a conductor 161. The conductor 161 is connected through a normally-open limit switch 163 to one terminal of the coil of a control relay 165, the other terminal of which is connected to the conductor 154. The conductor 161 is also connected to one terminal of the coil of a transfer system motor relay 170 through the normally-closed overload contacts 170a thereof and the normally-open contacts 165a of the relay 165, the other terminal of the coil of the relay 170 being connected to the conductor 154. The conductor 161 is also connected through the normally-open contacts 175 of the photorelay 29 and the normally-closed contacts 170b of the relay 170 to the junction between the limit switch 163 and the coil of the relay 165. The terminals of the transmitter 27 of the photorelay 29 are connected across a suitable 2.5 volt power supply.

The line 151 is also connected through the normally-open contacts 170c of the relay 170 and a thermal overload circuit breaker 172 to the transfer system drive motor 69, which is provided with a brake coil. The line 151 is also connected to the normally-open contacts 160d of the relay 160 and a thermal overload circuit breaker 162 to the outfeed conveyor drive motor 35.

The overall operation of the oven unloading system 20 will now be described. Initially, the system is in the configuration illustrated in FIGS. 3 and 4. When the switches 152 and 156 are closed, the lamp 159 is energized to indicate that the system is on and the relay 160 is energized through its normally-closed overload contacts 160a and the contacts 157 and 158 of the control switch 156. Upon energization of the relay 160, its contacts 160b–160d close, thereby latching the relay 160 in an energized condition and energizing the outfeed conveyor drive motor 35 for starting the outfeed conveyor 30.

The hearth conveyor 22 is separately powered and continuously running and supports thereon rows 25 of pies 26 which are spaced apart a predetermined distance. As a row 25 of pies approaches the exit end of the hearth conveyor 22, it interrupts the light beam of the photorelay 29, which is so arranged that when the beam is reestablished as the row of pies passes therebeyond, the photorelay 29 is energized to close the normally-open contacts 175 thereof and energize the control relay 165 through the normally-closed contacts 170b of the relay 170. The control relay 165 is a sequence relay, the contacts of which change condition each time the relay is energized. Upon energization of the relay 165, its contacts 165a close to energize the relay 170 through its normally-closed overload contacts 170a. When the relay 170 is energized, its contacts 170b open, thereby preventing further interruptions of the light beam of the photorelay 29 from having any effect on the system, and its contacts 170c close to energize the transfer system drive motor 69 and start the transfer conveyor chains 57. Upon de-energization of the control relay 165, its contacts 165a nevertheless remain closed to hold the relay 170 energized, the contacts 165a not changing state until the control relay 165 is again energized.

The standby position of the pickup carriage assembly 70, illustrated in FIG. 4, is so located in relationship to the speed of the hearth conveyor 22, that when the transfer system 40 is started by a row of pies interrupting the light beam of the photorelay 29, the pickup fingers 104 and the row of pies 26 will simultaneously arrive at the transfer station illustrated in FIG. 5 just before the exit end of the hearth conveyor 22, and the backstop assembly 110 will be moved to the stop position thereof just as the row of pies passes thereunder, in the manner described above. In this stop position, the stop bar 120 cooperates with the pickup fingers 104 to facilitate movement thereof beneath the rims of the pies 26 and prevents any of the pies 26 from accidentally being pushed back out of the pickup station in the event that any of the pies in the row are misaligned. As soon as the pickup fingers 104 move beneath the rims of the pies 26, they almost immediately lift the row 25 of pies as the mounting clips 71 of the pickup carriage assembly 70 move around the sprockets 55, thereby simultaneously permitting the backstop assembly 110 to return to its pass position, all as was described above. It will be appreciated that in its stop position, the stop bar 120 also serves to prevent any stray articles on the hearth conveyor 22 behind the row of pies 26 being picked up from interfering with the pickup operation.

The pickup carriage assembly 70 and the row 25 of pies carried thereby are transported by the conveyor chains 57 to the outfeed conveyor 30 and are lowered into position thereon at an unloading station as the mounting clips 71 move around the sprockets 56, as was described above, this movement also simultaneously moving the retaining fingers 141 of the unloading assembly 130 to the unloading position thereof, illustrated in solid line in FIG. 5. The system is so arranged that as the pickup fingers 104 reach their lowermost position they disengage from the pies 26 and begin moving horizontally back toward the oven 21, with the retaining fingers 141 insuring retaining of the row of pies 26 in position on the outfeed conveyor 30, as illustrated in FIG. 2, in case the pies stick to the pickup fingers 104.

As the pickup carriage assembly 70 moves back toward the oven 21, it engages and closes the limit switch 163 which is suitably positioned on the transfer system 40, thereby re-energizing the control relay 165 for reopening its contacts 165a and thereby de-energizing the relay 170. When the relay 170 is de-energized, its contacts 170b reclose and its contacts 170c reopen to de-energize the transfer system drive motor 69 to halt the conveyor chains 57. During this shutting off of the transfer system 40, the pickup carriage assembly 70 coasts a sufficient distance to ride past the limit switch 163, following it to reopen, with the pickup carriage assembly 70 stopping in its standby position illustrated in FIG. 4, where it awaits the arrival of the next row 25 of pies at the light beam of the photorelay 29.

It will be understood that, preferably, the rows 25 of pies on the hearth conveyor 22 are spaced apart by a time which is slightly greater than the time required for the pickup carriage assembly 70 to move through one complete cycle, so that the pickup carriage assembly 70 will come to rest in its standby position and the transfer system will be shut off between rows of pies. The system will then automatically recycle with the transfer system 40 being reactivated by the arrival of each row of pies to be picked up and transferred thereby.

It is a significant feature of the present invention that the transfer system 40 transfers the row 25 of pies from the hearth conveyor 22 to the outfeed conveyor 30 gently without damage to the pies, and also without changing the orientation of the longitudinal axis of the row 25. Thus, the row 25 is deposited on the outfeed conveyor 30 in the same orientation it had on the hearth conveyor 22 but, since the outfeed conveyor 30 is moving in a different direction from that of the hearth conveyor 22, the row 25 will be angled diagonally across the outfeed conveyor 30, as illustrated in FIG. 2.

More particularly, each row 25 of pies, as deposited on the outfeed conveyor 30, has the longitudinal axis thereof disposed at an acute angle A with the direction of travel of the outfeed conveyor 30. Thus, it will be appreciated that in order to accommodate the row 25 of pies thereon, the outfeed conveyor 30 must have a lateral width $W \geq D + U \sin A$, where U is the length of the row 25 and D is the diameter of an individual pie. As a result of this arrangement, it can be seeen that the outfeed conveyor 30 does not have to move the length U of an entire row of pies in order to make room for the next row thereon. Rather, it need only move a linear distance $L = S/\sin A$, where S is the distance measured perpendicular to the longitudinal axes of the rows 25 necessary to accommodate a row of pies, the distance S being equal to D plus the spacing between the rows of pies on the outfeed conveyor 30. In the embodiment illustrated in FIG. 2, the outfeed conveyor 30 need only move in the direction of travel thereof a distance approximately one-fifth the length of a row 25.

Accordingly, it will be understood that the linear speed of the outfeed conveyor 30 may be significantly reduced. Indeed, it is an important feature of this invention that the linear speed and width of the outfeed conveyor 30 may be made compatible with downstream processing operations by judicious choice of the angle A, thereby obviating any product handling steps between the outfeed conveyor and those downstream processing operations. Furthermore, it will be noted that both the hearth conveyor 22 and the outfeed conveyor 30 may remain continuously moving at all times, thereby further enhancing the efficiency of both the oven 21 and the downstream processing operations.

It will be noted that the oven unloading system 20 can be used with ovens of varying widths, and with rows of articles having varying numbers and sizes of articles therein. When it is desired to utilize the oven unloading system 20 with a different length row or a row of a different number and/or different size of articles, it is only necessary to remove the U clamps 101 on the pickup carriage assembly 70 and replace the plate 100 with a plate having the requisite number and size of pickup arms thereon. In like manner, the bolts 144 of the unloading assembly 130 may be removed and the retaining arms 140 may either be repositioned or replaced with different sizes or shapes of arms, as required. Furthermore, it will be appreciated that the transfer system 40 could be utilized with articles other than pies by replacing the pickup arms 103 with other suitably designed pickup mechanisms.

With articles less fragile than pies, it may not be necessary to lift the articles across the space between the hearth conveyor 22 and the outfeed conveyor 30. Rather, such non-fragile articles could be caused to slide across a "dead plate" 180 fitted to span the space between the hearth conveyor 22 and the outfeed conveyor 30, as illustrated in FIG. 13. In such an arrangement, the conveyor chains 57 might rotate in the opposite direction from that illustrated in FIGS. 1–11 and carry a pusher bar 185, 190 or the like which would drop behind a row of pies as it exits the hearth conveyor and push the row across the dead plate 180 to the outfeed conveyor 30 and then lift out of engagement with the row of pies.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. Apparatus for transferring elongated rows of articles from a transfer station along a continuously moving infeed conveyor to a depositing station spaced from the infeed conveyor, said apparatus comprising an endless transfer conveyor traveling between said transfer station and said depositing station, pickup means carried by said transfer conveyor and engageable with a row of articles at the transfer station for lifting the entire row of articles from the infeed conveyor and carrying it in a level upright condition to the depositing station, unloading mechanism at the depositing station movable between a pass position out of the path of the articles carried by said transfer conveyor and an unloading position disposed in the path of the articles carried by said transfer conveyor for engagement therewith, control means coupled to said unloading mechanism and responsive to movement of said pickup means to the depositing station for moving said unloading mechanism to the unloading position thereof for engagement with the row of articles carried by said pickup means and for cooperation with said pickup means to insure removal of the row of articles therefrom, said control means being responsive to movement of said pickup means from the depositing station for moving said unloading mechanism to the pass position thereof, and means for synchronizing the operation of said transfer conveyor with that of the infeed conveyor so that said pickup means and the row of articles to be picked up thereby arrive essentially simultaneously at the transfer station.

2. The apparatus set forth in claim 1, wherein said control means includes a first cam member carried by said pickup means and a second cam member carried by said unloading mechanism and disposed in the path of said first cam member of camming engagement therewith and movement thereby.

3. The apparatus set forth in claim 1, wherein said control means includes a first cam member carried by said pickup means and a second cam member carried by said unloading mechanism and disposed in the path of said first cam member for camming engagement therewith and movement thereby, and bias means coupled to said unloading mechanism for resiliently urging it to the pass position thereof, said second cam member being responsive to movement of said first cam member as said pickup means moves through the transfer station for moving said unloading mechanism to the unloading position thereof against the urging of said bias means.

4. The apparatus set forth in claim 1, wherein said unloading mechanism includes a plurality of unloading members equal in number to and respectively engageable with the articles in a row of articles for cooperation with said pickup means to insure removal of the row of articles therefrom.

5. Apparatus for transferring elongated rows of articles from a transfer station along a continuously moving infeed conveyor to a depositing station spaced from the infeed conveyor, said apparatus comprising an endless transfer conveyor traveling between said transfer station and said depositing station, pickup means carried by said transfer conveyor and engageable with a row of articles at the transfer station for lifting the entire row of articles from the infeed conveyor and carrying it in a level upright condition to the depositing station, backstop mechanism at the transfer station movable between a pass position out of the path of the rows of articles along the infeed conveyor and a stop position in the path of the rows of articles along the infeed conveyor, first control means coupled to said backstop mechanism and responsive to movement of said pickup means to the transfer station for moving said backstop mechanism to the stop position thereof behind the row of articles which has simultaneously moved to the transfer station, said backstop mechanism in the stop position thereof cooperating with said pickup means to facilitate the lifting thereby of the row of articles and prevent pushing of the articles back along the infeed conveyor, said first control means being responsive to movement of said pickup means from the transfer station for moving said backstop mechanism to the pass position thereof, unloading mechanism at the depositing station movable between a pass position out of the path of the articles carried by said transfer conveyor and an unloading position disposed in the path of the articles carried by said transfer conveyor for engagement therewith, second control means coupled to said unloading mechanism and responsive to movement of said pickup means to the depositing station for moving said unloading mechanism to the unloading position thereof for engagement with the row of articles carried by said pickup means and for cooperation with said pickup means to insure removal of the row of articles therefrom, said second control means being responsive to movement of said pickup means from the depositing station for moving said unloading mechanism to the pass position thereof, and means for synchronizing the operation of said transfer conveyor with that of the infeed conveyor so that said pickup means and the row of articles to be picked up thereby arrive essentially simultaneously at the transfer station.

6. The apparatus set forth in claim 5, wherein said first control means includes a first cam member carried by said pickup means and a second cam member carried by said backstop mechanism and disposed for camming engagement with said first cam member and movement thereby.

7. The apparatus set forth in claim 5, wherein said first control means includes a first cam member carried by said pickup means and a second cam member carried by said backstop mechanism and disposed for camming engagement with said first cam member and movement thereby, and bias means coupled to said backstop mechanism for resiliently urging it to the pass position thereof, said second cam member being responsive to camming engagement with said first cam member as said pickup means moves through said transfer station for moving said backstop mechanism to the stop position thereof against the urging of said biasing means.

8. The apparatus set forth in claim 5, wherein said pickup means includes a plurality of pickup members one greater in number than the articles in a row of articles, said pickup members being respectively receivable between the articles in the row and alongside the outer ones thereof for cooperation to engage and lift the entire row of articles.

9. Apparatus for transferring elongated rows of articles from a first conveyor moving continuously in a first direction essentially normal to the longitudinal axes of the rows of articles thereon, said apparatus comprising a continuously moving second conveyor moving in a second direction disposed at an oblique angle to the first direction, said second conveyor having a lateral width substantially less than the length of a row of articles, an endless transfer conveyor traveling between the first and second conveyors, pickup means carried by said transfer conveyor and engageable with a row of articles on the first conveyor for lifting the entire row of articles from the first conveyor and carrying it in a level upright condition to said second conveyor without changing the orientation of the longitudinal axis of the row of articles, unloading mechanism adjacent to said second conveyor and movable between a pass position out of the path of the articles carried by said transfer conveyor and an unloading position disposed in the path of the articles carried by said transfer conveyor for engagement therewith, control means coupled to said unloading mechanism and responsive to movement of said pickup means to said second conveyor for moving said unloading mechanism to the unloading position thereof for engagement with the row of articles carried by said pickup means and for cooperation with said pickup means to insure removal of the row of articles therefrom and retain them on said second conveyor, said control means being responsive to movement of said pickup means from the second conveyor for moving said unloading mechanism to the pass position thereof, and means for synchronizing the operation of said transfer conveyor with that of the first and second conveyors so that said pickup means and each row of articles to be picked up thereby arrive essentially simultaneously at the transfer station and so that between rows said second conveyor moves far enough to accommodate each row of articles as it arrives.

10. Apparatus for transferring elongated rows of articles from a first conveyor moving continuously in a first direction essentially normal to the longitudinal axes of the rows of articles thereon, said apparatus comprising a continuously moving second conveyor moving in a second direction disposed at an oblique angle to the first direction, said second conveyor having a lateral width substantially less than the length of a row of articles, an endless transfer conveyor traveling between the first and second conveyors, pickup means carried by said transfer conveyor and engageable with a row of articles on the first conveyor for lifting the entire row of articles from the first conveyor and carrying it in a level upright condition to said second conveyor without changing the orientation of the longitudinal axis of the row of articles, backstop mechanism adjacent to the first conveyor movable between a pass position out of the path of the rows of articles along the first conveyor and a stop position in the path of the rows of articles along the first conveyor, first control means coupled to said backstop mechanism and responsive to movement of said pickup means to the first conveyor for moving said backstop mechanism to the stop position thereof behind the row of articles to be picked up, said backstop mechanism in the top position thereof cooperating with said pickup means to facilitate the lifting thereby of the row of articles and prevent pushing of the articles back along the first conveyor, said first control means being responsive to movement of said pickup means from the first conveyor for moving said backstop mechanism to the pass position thereof, unloading mechanism adjacent to said second conveyor and movable between a pass position out of the path of the articles carried by said transfer conveyor and an unloading position disposed in the path of the articles carried by said transfer conveyor for engagement therewith, second control means coupled to said unloading mechanism and responsive to movement of said pickup means to said second conveyor for moving said unloading mechanism to the unloading position thereof for engagement with the row of articles carried by said pickup means and for cooperation with said pickup means to insure removal of the articles therefrom and retain them on said second conveyor, said second control means being responsive to movement of said pickup means from said second conveyor for moving said unloading mechanism to the pass position thereof, and means for synchronizing the operation of said transfer conveyor with that of the first and second conveyors so that said pickup means and each row of articles to be picked up thereby arrive essentially simultaneously at the transfer station and so that between rows said second conveyor moves far enough to accommodate each row of articles as it arrives.

* * * * *